No. 864,297. PATENTED AUG. 27, 1907.
W. GARDINER.
STORAGE BATTERY.
APPLICATION FILED DEC. 23, 1905.

2 SHEETS—SHEET 1.

Witnesses:
C. H. Seem
G. V. Domarus.

Inventor:
Wm. Gardiner
by Brown, Darby & Hopkins
Attys

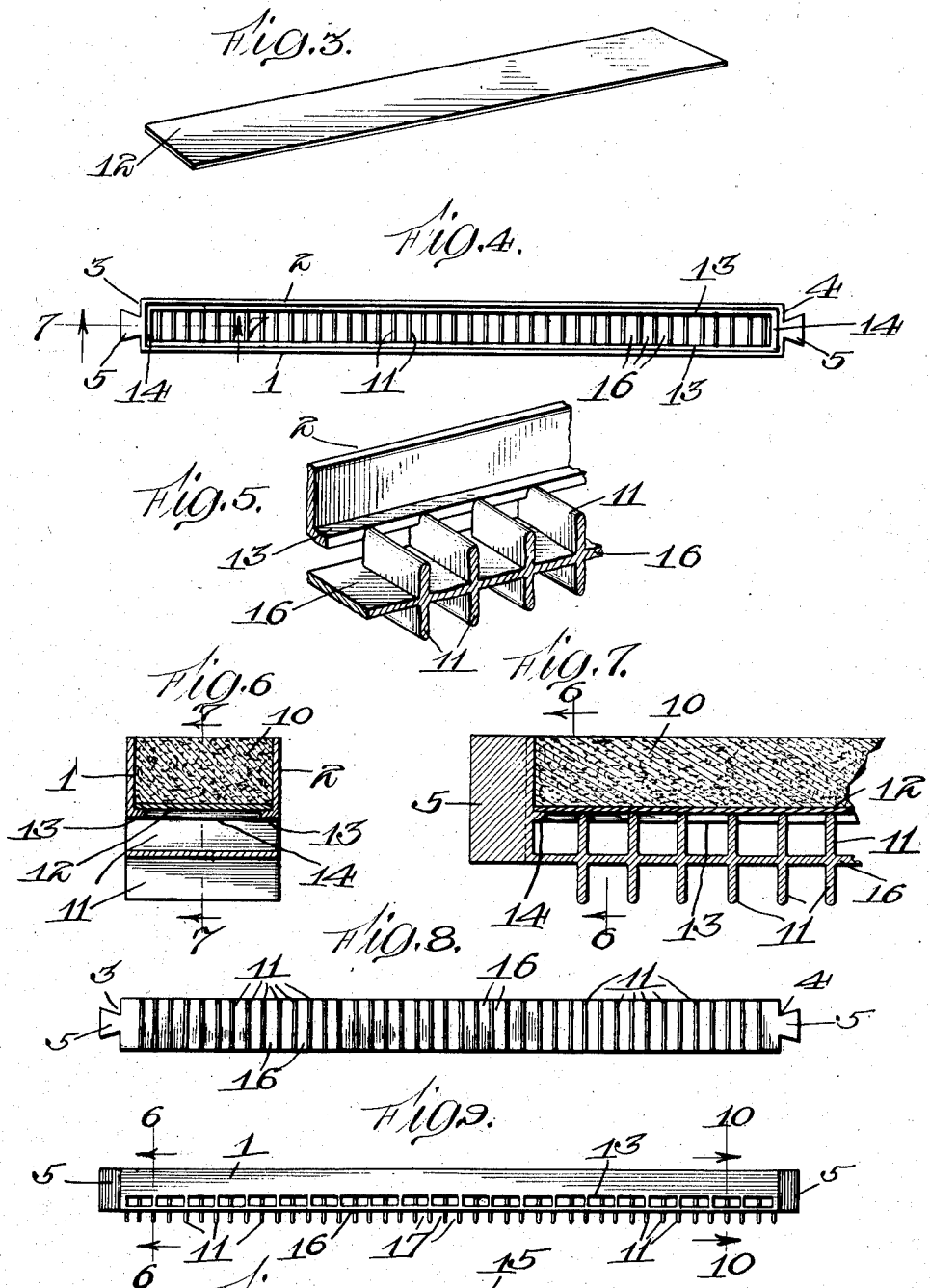

UNITED STATES PATENT OFFICE.

WILLIAM GARDINER, OF CHICAGO, ILLINOIS, ASSIGNOR TO CORNELIUS P. STRINGFIELD, OF CHICAGO, ILLINOIS.

STORAGE BATTERY.

No. 864,297.        Specification of Letters Patent.        Patented Aug. 27, 1907.

Application filed December 23, 1905. Serial No. 293,073.

*To all whom it may concern:*

Be it known that I, WILLIAM GARDINER, a citizen of the United States, residing at Chicago, in the county of Cook and State of Illinois, have invented certain new and useful Improvements in Storage Batteries, of which the following is a full, clear, and exact specification.

This invention relates to improvements in storage batteries, and more particularly to the plates therefor, and the invention has for its primary object to provide improved and efficient means for preventing the active material from washing out of its proper place in the plate, thereby shortening the life of the battery, as well as short-circuiting the same, while also affording free access of the electrolyte to the active material and the free escape of the gases therefrom.

With a view to the accomplishment of these objects, and certain other objects which will appear hereinafter, the invention consists in the features of novelty which are shown in the accompanying drawings and more particularly pointed out in the claims.

Figure 1:
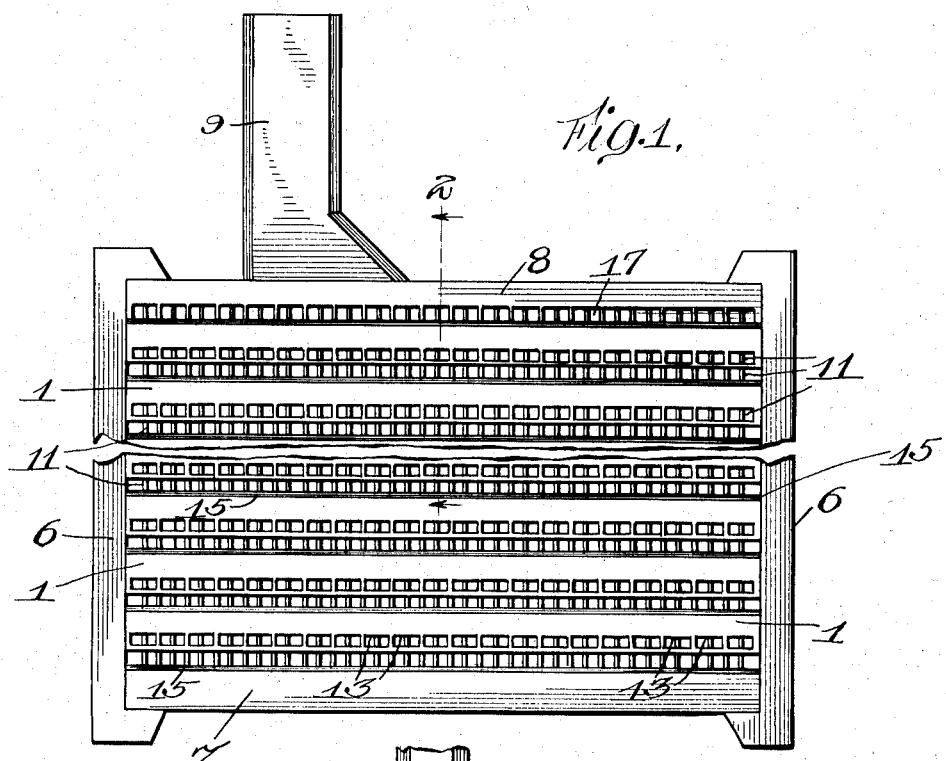
Figure 2:
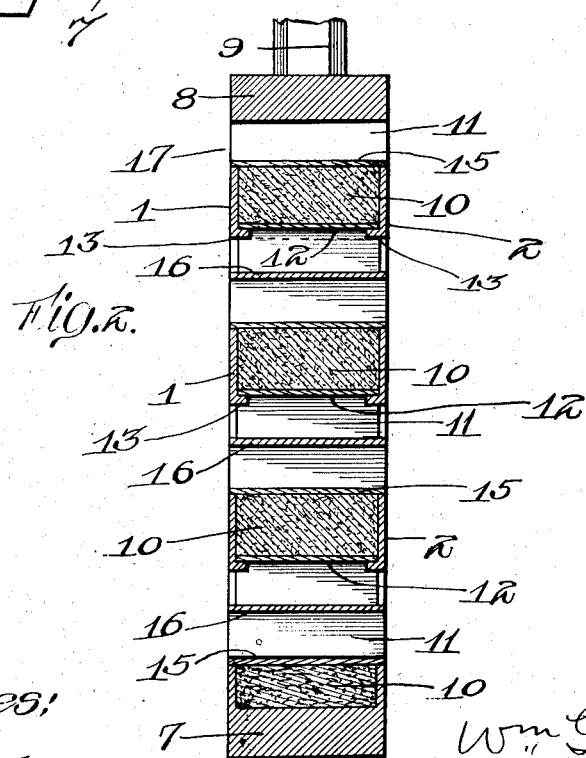

In the said drawings,—Figure 1 is a side elevation of a battery plate, partially broken away, embodying this invention. Fig. 2 is an enlarged cross-section thereof on the line 2—2, Fig. 1. Fig. 3 is a detail perspective view of a porous strip employed as an element in the combination, hereinafter described. Fig. 4 is a plan view of one of the sections detached, hereinafter described. Fig. 5 is an enlarged detail perspective view of a portion of one of the sections, showing one of the side walls as well as the end walls broken away. Fig. 6 is a vertical cross-section on the line 6—6, Fig. 7. Fig. 7 is a vertical longitudinal section on the line 7—7, Fig. 6. Fig. 8 is a detail bottom view of one of the sections. Fig. 9 is a side elevation thereof. And Fig. 10 is an enlarged cross-section on the line 10—10, Fig. 9.

The battery plate as shown in Fig. 1 is made up of a number of superimposed sections, a complete detail of one of which is shown in Figs. 4, 8 and 9. This section is of trough-like formation, having side walls 1, 2, and end walls 3, 4, the latter being provided with dovetailed lugs 5, or lugs of any other suitable form, which facilitate the attachment of the sections to the end bars 6 commonly employed in the construction of battery plates of this character, and which end bars may be, and preferably are, cast directly upon the lugs 5, so that the latter will be incorporated therewith. These sections, of any desired number, are arranged contiguous to each other in the relation shown in Figs. 1 and 2, preferably superimposed one upon another, on the upper side of a bottom bar 7, which is also secured to the end bars 6 in the same or an equivalent manner to that employed for the attachment of the lugs 5, and on the top of the tier of sections is employed a top bar 8, from which one of the pole-pieces 9 rises, the top bar 8 being attached to the end bars 6 like the bar 7.

The top of the trough-like section, detailed in Figs. 4 to 10, is entirely open, so that the active material, which is shown at 10, may be readily introduced thereinto, and after being introduced will have its entire upper surface exposed to the action of the electrolyte, while the bottom of the section is also open say for a number of the transverse bars or ribs 11 extending thereacross, and projecting considerably below the side walls 1, 2, so as to form lateral passages for the admission of the electrolyte to the active material and the escape of the gases therefrom.

Arranged within the trough-like section, and fitted accurately between its walls, is a strip or sheet 12 composed of some suitable porous material, such as cellulose, and upon which the active material 10 is packed, the upper edges of the ribs or cross-bars 11 being carried upwardly between the side walls so that the strip 12 will rest directly thereon and be supported thereby, and in order that the active material may not escape around the edges of the strip 12 and the strip will be held from being bowed downwardly between the cross-bars 11 by the expansion of the active material, the side and end walls at their lower edges are provided with inwardly-extending flanges 13, 14, respectively, upon which the edges of the strip 12 are directly supported. The next section immediately below is provided on its upper side with another one of these strips similar to the strip 12, such strip being indicated at 15, which completely covers the active material 10 therein, and also preferably overlaps the side walls 1, 2, so that the lower edges of the ribs 11 will impinge directly against the upper surface of the strip 15 and hold it down into firm engagement with the surface of the active material 10, as well as pinching it against the upper edges of the walls 1, 2, whereby the expansion of the active material will be prevented from lifting the strip 15 out of substantial engagement with the active material or the side walls 1, 2, and the active material will be consequently prevented from washing out. In order that the thin ribs 11 may withstand the pressure necessary for thus holding the strips 15 into firm engagement with the various sections, they are stiffened by a longitudinal web 16 cast integrally therewith, and which web of course also increases the exposed metallic area, with a corresponding increase in the efficiency of the battery.

The bottom bar 7 is a plain trough-like section, as better shown in Fig. 2, which need not be provided with ribs 11, but which is provided with the active material, and is covered over by one of the porous strips 15. The top bar 8 of the plate is a plain bar with transverse ribs or teeth 17 on its lower side pressing against the uppermost one of the strips 15 for holding it down against the active material in the top section.

The trough shaped sections having teeth or cross-bars formed on the bottoms thereof in combination with covering strips of porous material which are pressed into contact with the surface of the active material in the trough or section below and held firmly against the edges of the lower section by said teeth are not claimed broadly in this application, as the same constitute the subject matter of the claims in my pending applications Serial No. 275,082, filed August 21, 1905, renewal Serial No. 369,580, filed April 22, 1907, originally filed June 19, 1905, and Serial No. 300,035, filed February 8, 1906.

I claim:

1. In a storage battery, the combination of a series of trough-like juxtaposed sections each open at one side and having another of its sides provided with apertures contiguous to the next adjacent section; a porous strip covering said apertured side on the inner side thereof; the active material bearing against said strip within the section, and a porous strip covering said open side, said sections having means interposed between them for holding the last said strip in place, and forming passages for the electrolyte between the two aforesaid strips.

2. In a storage battery, the combination of a series of juxtaposed trough-like sections each having one side open and another side apertured and provided with integral cross-bars projecting therefrom; a porous strip interposed between each two contiguous sections, and directly against which strip said cross-bars bear; a porous strip arranged within each section against said cross-bars, and active material confined in each section between said strips.

3. In a storage battery, the combination of a series of juxtaposed trough-like sections each having one side open and another of its sides provided with integral cross-bars projecting therefrom; a porous strip interposed between each two contiguous sections and directly against which strip said cross-bars bear; a porous strip arranged within each section against said cross-bars, and active material confined in each section between such strips, the interior of each section having a surrounding flange upon which the inner one of said strips directly rests.

4. In a storage battery, the combination of a series of juxtaposed trough-like sections each having one side open and another side provided with integral cross-bars projecting therefrom; a porous strip interposed between each two contiguous sections and directly against which strip said cross-bars bear; said cross-bars being connected together longitudinally of the section by an integral web situated intermediate the edges of the cross-bars whereby the cross-bars will project from the web on one side towards one section and on the other side towards the contiguous section; a porous strip arranged within each section and against said cross-bars, and active material confined in each section between said strips.

5. In a storage battery, the combination of a series of juxtaposed trough-like sections, each having one side open and another of its sides provided with apertures, a porous strip arranged in each section and closing said apertures, a quantity of active material disposed upon said strip within the section, and a second porous strip covering the active material and interposed between the same and the apertured side of the contiguous section.

In testimony whereof I have signed my name to this specification, in the presence of two subscribing witnesses, on this 1st day of December, A. D. 1905.

WILLIAM GARDINER.

Witnesses:
 FRANCIS A. HOPKINS,
 E. C. SEMPLE.